(12) United States Patent
Lim et al.

(10) Patent No.: US 9,610,960 B2
(45) Date of Patent: Apr. 4, 2017

(54) INVENTORY MANAGEMENT SYSTEM USING AUTOMATED GUIDED VEHICLE

(71) Applicant: HANMI IT CO., LTD., Seoul (KR)

(72) Inventors: Jong Hoon Lim, Seoul (KR); Chulwoo Jun, Seoul (KR)

(73) Assignee: HANMI IT CO., LTD., Seoul (KR)

( * ) Notice: Subject to any disclaimer, the term of this patent is extended or adjusted under 35 U.S.C. 154(b) by 0 days.

(21) Appl. No.: 14/991,411

(22) Filed: Jan. 8, 2016

(65) Prior Publication Data

US 2016/0121913 A1    May 5, 2016

Related U.S. Application Data

(63) Continuation of application No. PCT/KR2014/006288, filed on Jul. 11, 2014.

(30) Foreign Application Priority Data

Jul. 11, 2013 (KR) .......................... 10-2013-0081561

(51) Int. Cl.
| | |
|---|---|
| B61L 27/00 | (2006.01) |
| G05D 1/00 | (2006.01) |
| G05D 1/02 | (2006.01) |
| G06K 17/00 | (2006.01) |
| G06K 7/10 | (2006.01) |
| B65G 1/137 | (2006.01) |
| G06Q 10/08 | (2012.01) |

(52) U.S. Cl.
CPC ............ *B61L 27/00* (2013.01); *B65G 1/1371* (2013.01); *G05D 1/0094* (2013.01);
(Continued)

(58) Field of Classification Search
CPC .... B61L 27/00; G05D 1/0094; G05D 1/0212; G06K 17/0006; G06K 7/10792;
(Continued)

(56) References Cited

U.S. PATENT DOCUMENTS

| | | | | |
|---|---|---|---|---|
| 5,963,920 | A * | 10/1999 | Rose | G06Q 20/203 705/22 |
| 2004/0131451 | A1* | 7/2004 | Winkler | B65G 1/0435 414/278 |

(Continued)

FOREIGN PATENT DOCUMENTS

| | | |
|---|---|---|
| JP | H05-221516 A | 8/1993 |
| JP | H10-297718 A | 11/1998 |
| JP | 2004-250148 A | 9/2004 |
| KR | 10-2003-0047718 A | 6/2003 |
| KR | 10-2003-0054256 A | 7/2003 |
| KR | 10-0652022 B | 11/2006 |
| KR | 10-2007-0064570 A | 6/2007 |

(Continued)

*Primary Examiner* — Rodney Butler
*Assistant Examiner* — Frederick Brushaber
(74) *Attorney, Agent, or Firm* — KORUS Patent, LLC; Seong Il Jeong

(57) ABSTRACT

An inventory management system that uses an automated guided vehicle that scans articles on a shelf case while reciprocating along guide lines is introduced. This inventory management system using an automated guided vehicle may include a scanning unit configured to recognize information about articles placed in a shelf case, guide lines deployed along a plurality of shelf cases that are spaced apart from each other, a vehicle configured to support the scanning unit, to recognize the guide lines, and to move along the guide lines, and a control unit configured to control the vehicle so that the vehicle moves along the guide lines recognized by the line recognition unit.

11 Claims, 8 Drawing Sheets

(52) U.S. Cl.
CPC ....... *G05D 1/0212* (2013.01); *G06K 7/10792* (2013.01); *G06K 17/0006* (2013.01); *G06Q 10/087* (2013.01); *B65G 2203/044* (2013.01); *B65G 2203/046* (2013.01); *G06K 2017/009* (2013.01); *G06K 2017/0074* (2013.01)

(58) Field of Classification Search
CPC ..... G06K 2017/009; G06K 2017/0074; B65G 1/1371; B65G 2203/044; B65G 2203/046; G06Q 10/087
See application file for complete search history.

(56) References Cited

U.S. PATENT DOCUMENTS

| | | | |
|---|---|---|---|
| 2014/0190913 A1* | 7/2014 | Hardy | A47F 1/12 211/59.3 |
| 2016/0239021 A1* | 8/2016 | Pous Andres | G06Q 10/087 |
| 2016/0260054 A1* | 9/2016 | High | G05D 1/0297 |

FOREIGN PATENT DOCUMENTS

KR 10-0875537 B1 12/2008

* cited by examiner

INVENTORY MANAGEMENT SYSTEM USING AUTOMATED GUIDED VEHICLE

CROSS-REFERENCE TO RELATED APPLICATIONS

This application is a continuation of International Application No. PCT/KR2014/006288, filed on Jul. 11, 2014, which claims the benefit of the Korean Patent Application No. 10-2013-0081561, filed Jul. 11, 2013, the contents of which are hereby incorporated by reference in their entirety into this application.

TECHNICAL FIELD

The present invention relates to an inventory management system using an automated guided vehicle, and more particularly to an inventory management system using an automated guided vehicle, which can efficiently scan articles spaced apart on shelf cases while moving along guide lines.

BACKGROUND ART

With the development of wireless recognition technology using Radio Frequency Identification (RFID), technology capable of applying an RFID system to a shelf case and collecting information about articles on the shelf case has been developed.

For example, when RFID tags are attached to articles, the articles are displayed on a shelf case and the RFID tags are read by moving a scanning device, a reader can not only check the articles, stored on a shelf case, and the warehousing and release status of the articles in real time, but can also acquire specific information, such as the individual characteristics, manufacture date, expiration date and the like of each article, from the tag information of the RFID tags.

In order to scan articles on shelves using a conventional scanning device, an operator directly scans the RFID tags of articles using a reader, or the RFID tags of articles are scanned via a scanning device installed on a shelf case.

Meanwhile, in a space (a shop, a pharmacy, a mart, a library, or the like) where a plurality of shelf cases is disposed, it is difficult to effectively scan articles displayed on shelves via the above-described method.

Therefore, there is a demand for a scheme for efficiently scanning articles displayed on a plurality of shelf cases while stably moving along a predetermined path in a specific space where a plurality of shelf cases is disposed.

PRECEDING TECHNOLOGY DOCUMENT

Patent Document

Korean Patent Application Publication No. 10-2003-0047718 (published on Jun. 18, 2003)

DISCLOSURE

Technical Problem

The present invention is provided to overcome the above-described problems, and an object of the present invention is to provide an inventory management system using an automated guided vehicle, which can implement efficient movement for the scanning of articles.

Technical Solution

According to an aspect of the present invention, there is provided an inventory management system using an automated guided vehicle, including: a scanning unit including one or more antennas vertically disposed at locations corresponding to the heights of a shelf case; guide lines deployed along one or more shelf cases; a vehicle configured to support the scanning unit, to recognize the guide lines, and to move along the guide lines; and a control unit configured to control the vehicle so that the vehicle moves along the guide lines.

In this case, the inventory management system may further include a charging station disposed adjacent to the guide lines, and configured to charge the battery of the vehicle in the state in which the vehicle moves along the guide lines, or moves and stops.

Furthermore, the inventory management system may further include: a guidance rail installed on the shelf case in parallel with the guide lines; and a guide portion formed on a side portion of the vehicle so that the vehicle can be supported by the guidance rail when the vehicle moves in parallel with the shelf case.

Furthermore, the guide lines may employ a magnetic guidance method.

Furthermore, the vehicle may include: a body configured such that the scanning unit is mounted thereon; a line recognition unit configured to recognize the guide lines; a drive unit installed on the body, and configured to include drive rollers that move along the guide lines in response to a drive signal from the control unit; and a battery configured to provide power to the drive unit.

Furthermore, the vehicle may further include: an obstacle detection unit configured to detect an obstacle located in front of itself; and a communication module configured to apply sensing signals, detected by the line recognition unit and the obstacle detection unit, to the control unit.

Furthermore, the scanning unit may include: a support arm installed on the vehicle; scanning arms spaced apart on the support arm in a vertical direction so that the scanning arms face shelf cells of the shelf case; and antennas connected to the front ends of the scanning arms in order to scan information from articles located in the shelf cells.

Furthermore, each of the scanning arms may include: a main scanning arm connected to the support arm; and a sub scanning arm connected to an end of the main scanning arm so that the sub scanning arm can be selectively inserted into and retracted from the main scanning arm to adjust the length of the scanning arm.

Furthermore, RFID tags may be attached to the articles, and the antennas may recognize the RFID tags.

Furthermore, the antennas may be connected to the scanning arms so that the antennas can be tilted.

Furthermore, the scanning unit may further include an image processing unit installed at the upper end of the support arm in order to determine the locations of the articles and to capture images of the articles.

Furthermore, the control unit may control the vehicle and the scanning unit using identifiers included in the guide lines.

Furthermore, the control unit may receive the location information of shelf cells from the identifiers of the guide lines, and may enable antennas of the scanning unit, located to face the shelf cells, to be selectively operated.

Advantageous Effects

The embodiments of the present invention have the advantage of efficiently and stably scanning articles stored on shelf cases while the scanning unit is moving along guide lines disposed in parallel with the shelf cases.

Furthermore, the embodiments of the present invention have the advantage of providing guide lines that enable the scanning unit to move around articles in shelf cases within a more proximal distance, thereby improving the rate of reading articles.

[Description of Reference Symbols]

| | |
|---|---|
| 10: shelves | 20: article |
| 100: scanning unit | 110: support arm |
| 120: scanning arm 120 | 130: antenna |
| 140: image processing unit | 200: guide line |
| 300: vehicle | 310: body |
| 320: line recognition unit | 330: obstacle detection unit |
| 340: drive unit | 341: drive motor |
| 342: drive roller | 343: support roller |
| 344: drive belt | 350: battery |
| 360: communication module | 400: control unit |
| 500: charging station | 610: guidance rail |
| 620: guide portion | |

MODE FOR INVENTION

Embodiments of the present invention will be described in detail with reference to the accompanying drawings. Furthermore, in the following description of the present invention, if it is determined that detailed descriptions of known configurations and functions may make the gist of the present invention obscure, they will be omitted.

Preferred embodiments of the present invention are described in detail below with reference to the accompanying drawings.

Figure 1:
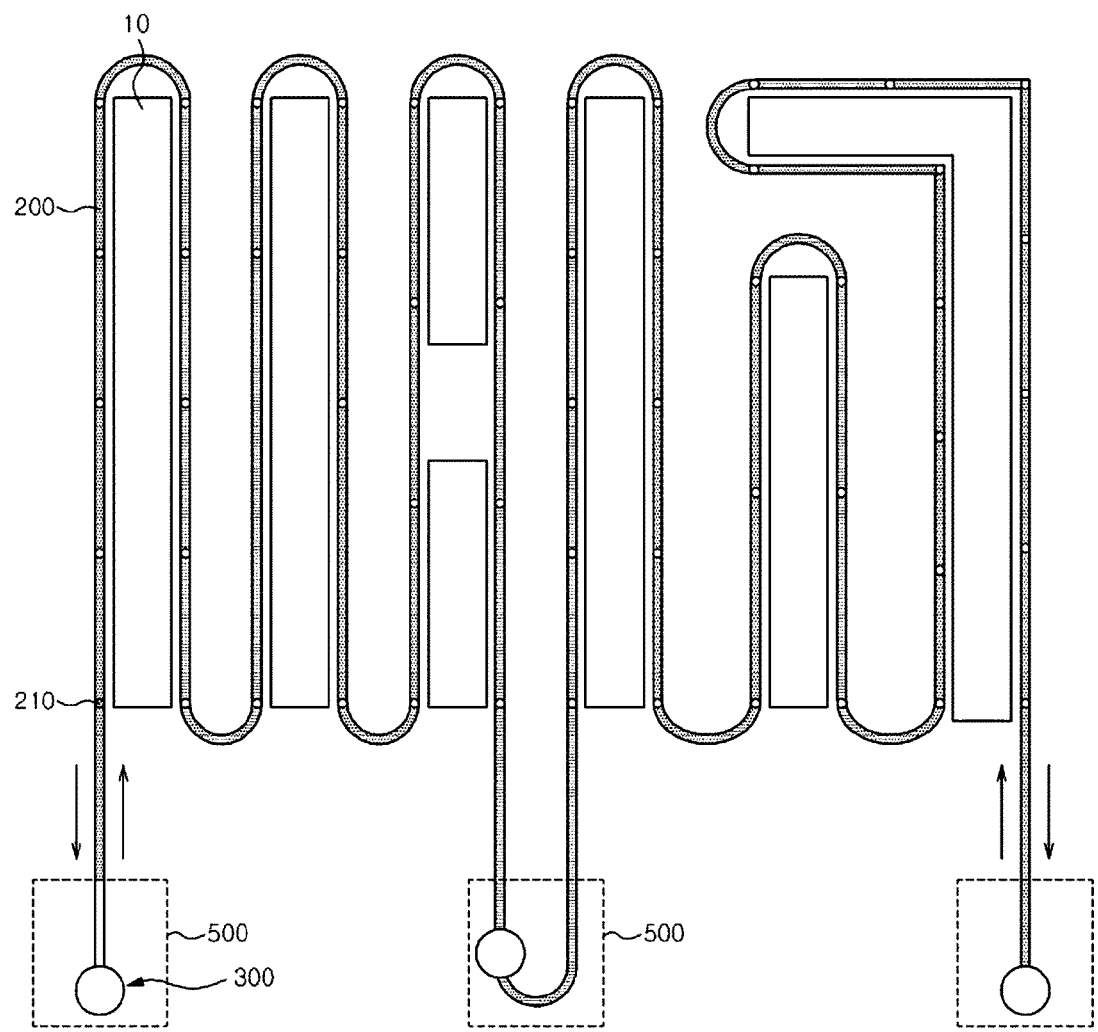
FIG. 1 is a plan view showing an inventory management system using an automated guided vehicle according to an embodiment of the present invention.
Figure 2:
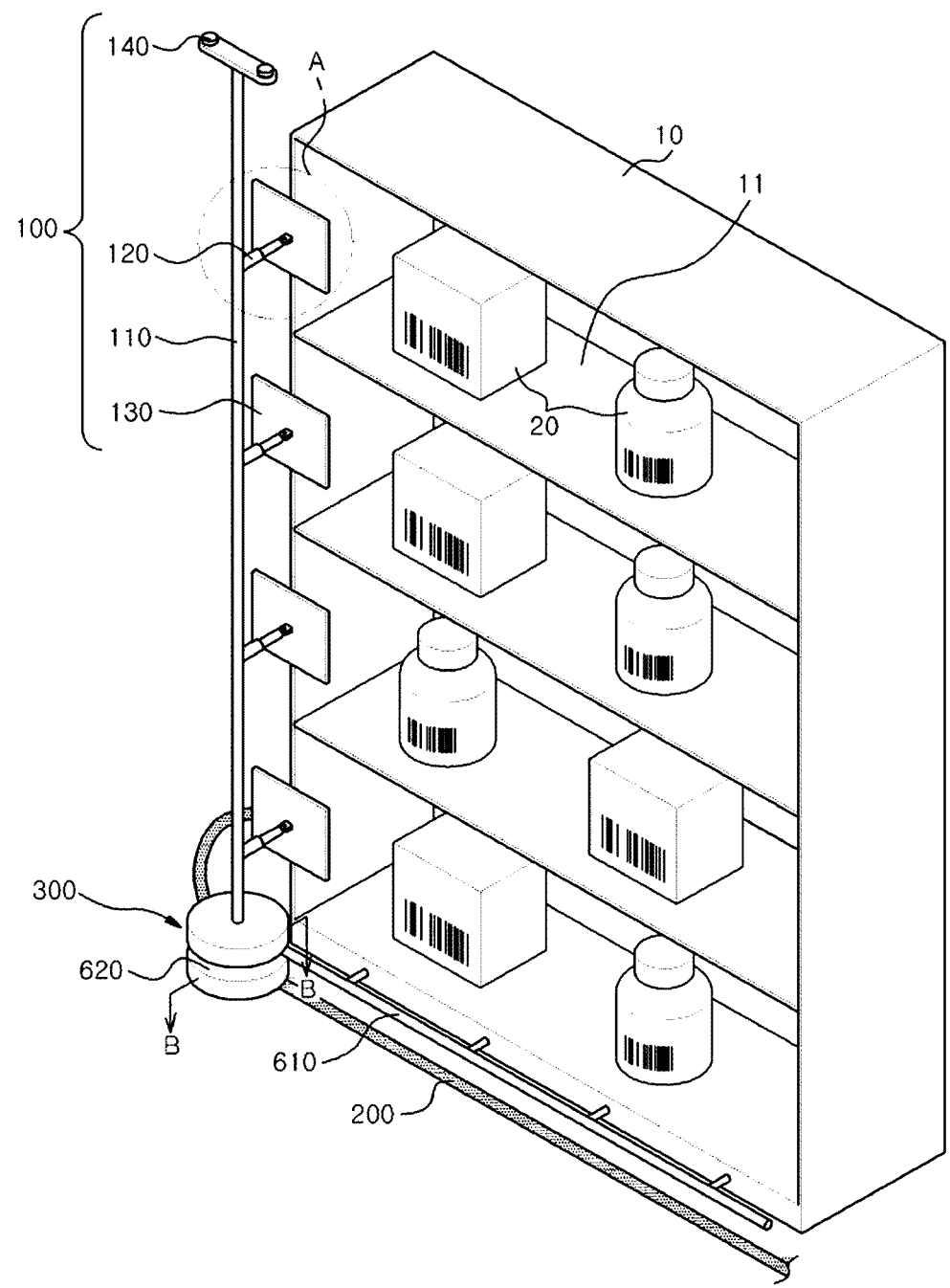
FIG. 2 is an enlarged perspective view showing part of a management system using an automated guided vehicle according to an embodiment of the present invention inventory in an enlarging manner.

FIG. 1 is a plan view showing an inventory management system using an automated guided vehicle according to an embodiment of the present invention, and FIG. 2 is an enlarged perspective view showing part of a management system using an automated guided vehicle according to an embodiment of the present invention inventory in an enlarging manner.

As shown in FIGS. 1 and 2, the inventory management system according to the embodiment of the present invention may provide a path for a vehicle 300 on the floor of a space where a plurality of shelf cases 10 is disposed. In this case, this space may include all places where a plurality of shelf cases 10, on which articles 20 are displayed, is disposed to be spaced apart from each other. For example, this space may be a shop, such as a pharmacy or a mart, where articles are displayed, a library where books are displayed, or a factory where industrial materials are stacked.

This inventory management system may include a scanning unit 100, guide lines 200, and a vehicle 300.

More specifically, the scanning unit 100 may scan the articles 20, to which Radio Frequency (RF) tags have been attached, on the shelf cases. Although RFID-based technology is applied to the present embodiment, all types of wireless identification technology, other than the RFID-based technology, that enable the information of articles to be provided in a wireless manner may be applied in various manners.

This scanning unit 100 may include: a support arm 110 installed on the vehicle 300; scanning arms 120 disposed to be spaced apart along the support arm 110 in the vertical direction thereof; antennas 130 provided at the front ends of the scanning arms 120; and readers (not shown) configured to read the tag information of the articles from scan information received from the antennas 130. Although the readers (not shown) are not shown in the drawings, they may be integrated with antennas 130. The tag information read under the control of a control unit (not shown), which will be described later, may be stored in the control unit (not shown). Alternatively, the readers may be integrated with the control unit (not shown) into a single device.

In this case, the support arm 110 is disposed perpendicular to the body 310 of the vehicle 300, and an image processing unit 140 may be provided at the upper end of the support arm 110. The image processing unit 140 may be composed of a photo sensor, a photo camera or a video camera that captures an image of an article 20 or a surrounding environment and that determines the location of the article 20. For example, the image processing unit 140 may be used to use an image, acquired via the image processing unit 140, in order to determine whether an article 20 to which an RF tag has been attached is hidden by an obstacle when the article 20 is hidden by the obstacle and not identified. However, this is merely an example, and an embodiment of the present invention is not limited to this example.

Figure 3:
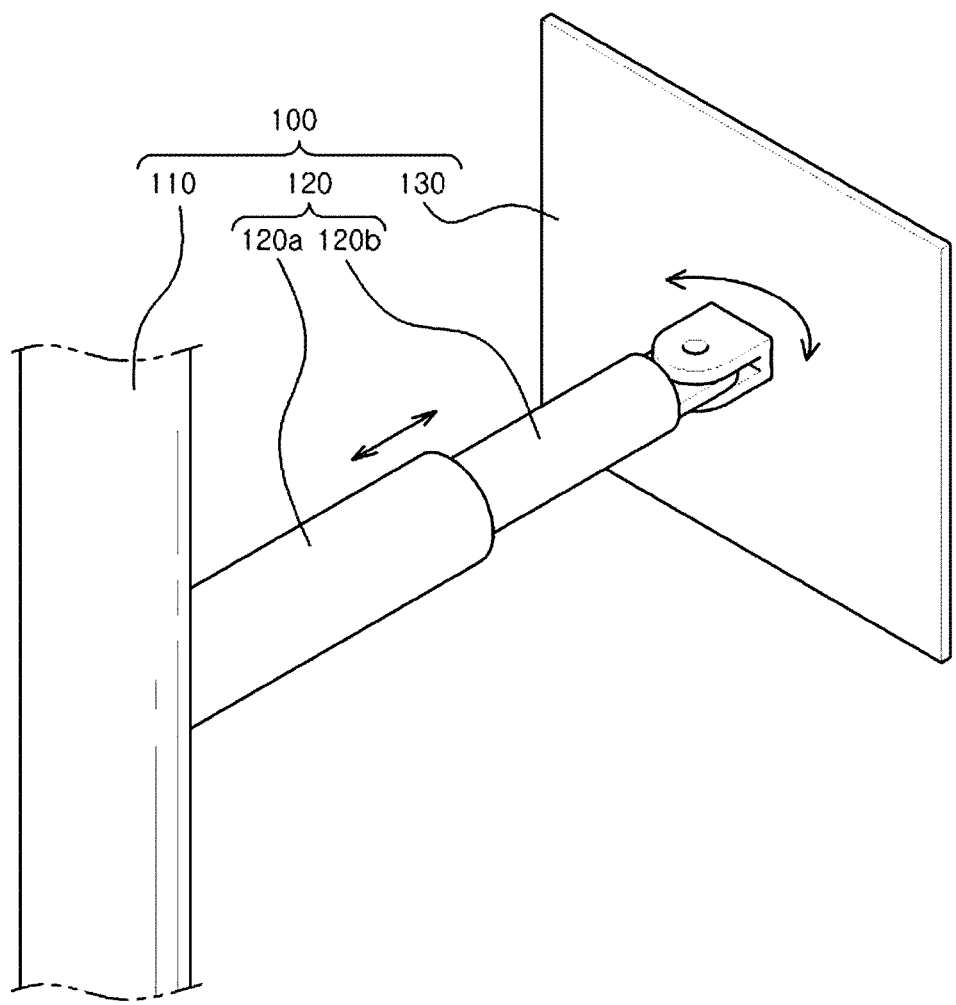
FIG. 3 is an enlarged view showing portion "A" of FIG. 2 in an enlarging manner.

FIG. 3 is an enlarged view showing portion "A" of FIG. 2 in an enlarging manner.

As shown in FIG. 3, each of the scanning arms 120 may be configured such that the length thereof can be adjusted. For example, the scanning arm 120 may include: a main scanning arm 120a vertically connected to the support arm 110; and a sub scanning arm 120b connected to an end of the main scanning arm 120a so that the sub scanning arm 120b can be selectively inserted into and retracted from the main scanning arm 120a, and configured to adjust the overall length of the scanning arm 120.

Each of the antennas 130 may include a penetration antenna, a horn antenna or a thin patch antenna that scans an RF signal from an RF tag that has been attached to the article 20.

The plurality of antennas 130 may be provided to be spaced apart on the support arm 110 in the vertical direction thereof so that the antennas 130 face respective shelf cells 11 located in the tiers of each of the shelf cases 10. Since these antennas 130 are installed at respective ends of the scanning arms 120 and are located adjacent to the article 20 of the shelf cells 11, they can effectively scan the articles 20 on the shelf cells 11.

In particular, one of the antennas 130 corresponding to a scanning target tier of the shelf case 10 (including a shelf cell) may be adjusted such that it can be selectively turned on and off by the control unit (not shown), which will be described later. For example, when the control unit (not shown) receives the location information of a shelf cell 11 from an identifier 210 of the guide lines 200, the control unit (not shown) may selectively turn on and off the operation of one of the antennas 130 corresponding to the shelf cell 11 so that only the corresponding antenna 130 can be operated.

The antennas 130 may be connected to the scanning arms 120 so that they can be tilted with respect to the scanning arms 120. When the antennas 130 are directional antennas, the antennas 130 are disposed to be titled to the articles 20 placed on the shelf cells 11, thus more effectively scanning the articles 20.

Figure 4:
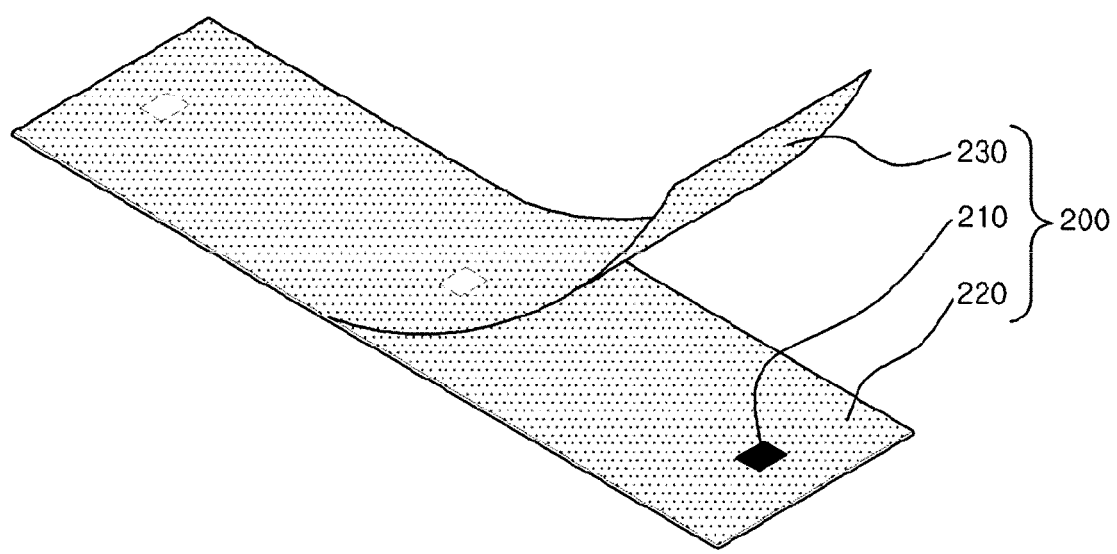
FIG. 4 is a perspective view showing a guide line of an inventory management system using an automated guided vehicle according to an embodiment of the present invention.

FIG. 4 is a perspective view showing a guide line of an inventory management system using an automated guided vehicle according to an embodiment of the present invention.

As shown in FIG. 4, the guide lines 200 correspond to a configuration of a line tracer for guiding the vehicle 300 through movement, and may be successively disposed along the plurality of shelf cases 10. For example, these guide lines 200 may be disposed in parallel with the shelf cases in the form of rectilinear lines, or the guide lines 200 that are disposed in the form of rectilinear lines may be connected in the form of curved lines.

Each of the guide lines 200 may include: a piece of magnetic tape 220 attached to the floor of the space where the shelf cases are disposed; an identifier 210 attached onto the top surface of the magnetic tape 220; and a protective film 230 configured to cover and protect the identifier 210. In this case, a plurality of identifiers 210 may be provided along the guide lines 200, and identification information may be included in each of the identifiers 210. The identifier 210 may be an RFID tag, a barcode, or a Quick Response (QR) code, but these are merely embodiments. The identifier 210 may be any one of all magnetic, optical and other methods-based reading targets that can be read by an identifier reader, which will be described later, provided on the vehicle 300. Furthermore, according to the present invention, in an embodiment, all the identifiers 210 may have the same information, and may be attached to a track, formed by the guide lines 200, at regular intervals.

These identifiers 210 are read by the vehicle 300. The control unit 400 may determine the current location of the vehicle 300 and the path of the vehicle 300, may selectively operate the scanning unit 100, or may adjust the height of the antenna 130 based on the read identification information of each of the identifiers 210. For this purpose, location information or a control command corresponding to the identification information included in the identifier 210 may be stored in the control unit 400 in advance.

Furthermore, when all the identifiers 210 have the same identification information and are disposed at regular intervals in an embodiment, the control unit 400 may determine the current location of the vehicle 300 by counting the number of times identifiers 210 are detected while moving from the start point of the guide lines 200, and may perform control commands (the on and off commands of the scanning unit 100, a command to adjust the height of the antenna, etc.) registered in accordance with respective locations in advance.

Although a magnetic guidance method is applied to the guide lines 200 in the present embodiment, a guidance method for the guide lines 200 is not limited thereto, but may include various types of guidance methods. For example, the guide lines 200 may employ one of an electronic guidance method using magnetic fields that are generated by applying current to guidance lines disposed on the surface of a floor, an optical guidance method of disposing reflective tapes on the surface of a floor and performing optical guidance, a laser guidance method of radiating laser beams onto the surface of a floor and detecting reflected laser beams, and a PGPS guidance method using a navigation system.

The vehicle 300 is composed of a weight body having a specific weight in order to maintain balance, and may function to recognize the guide lines 200 and move along the guide lines 200.

Figure 5:
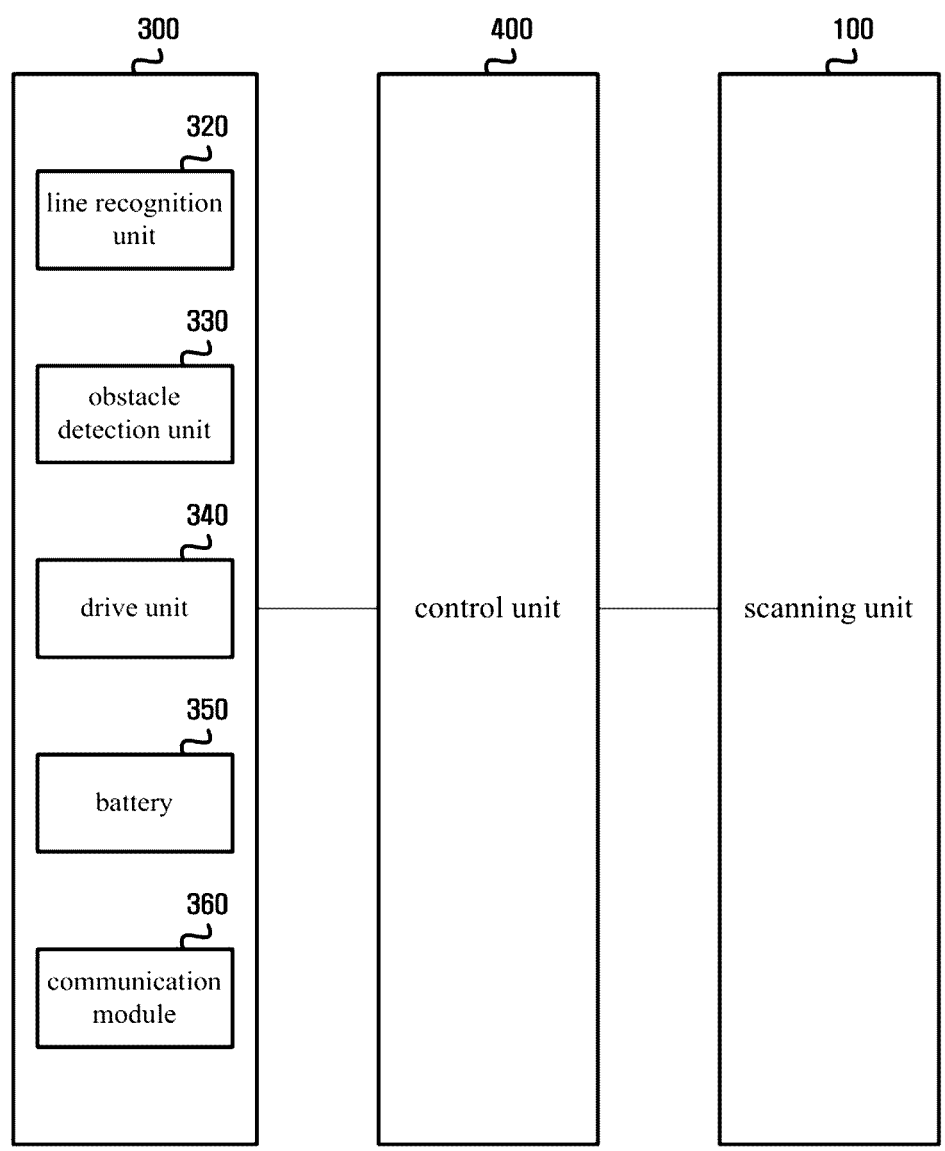
FIG. 5 is a block diagram showing the configuration of an inventory management system using an automated guided vehicle according to an embodiment of the present invention.
Figure 6:
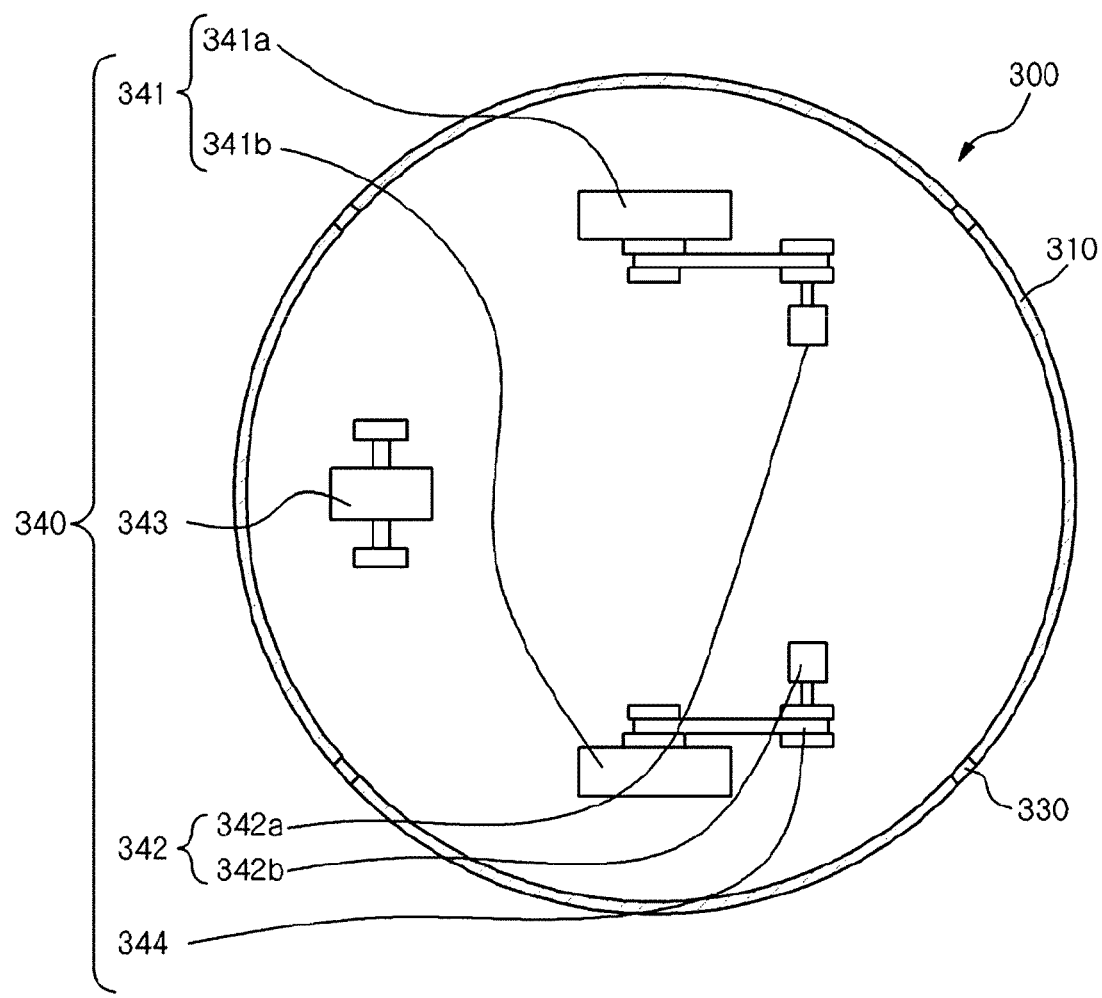
FIG. 6 is a transverse sectional view taken along line "B-B" of FIG. 2.
Figure 7:
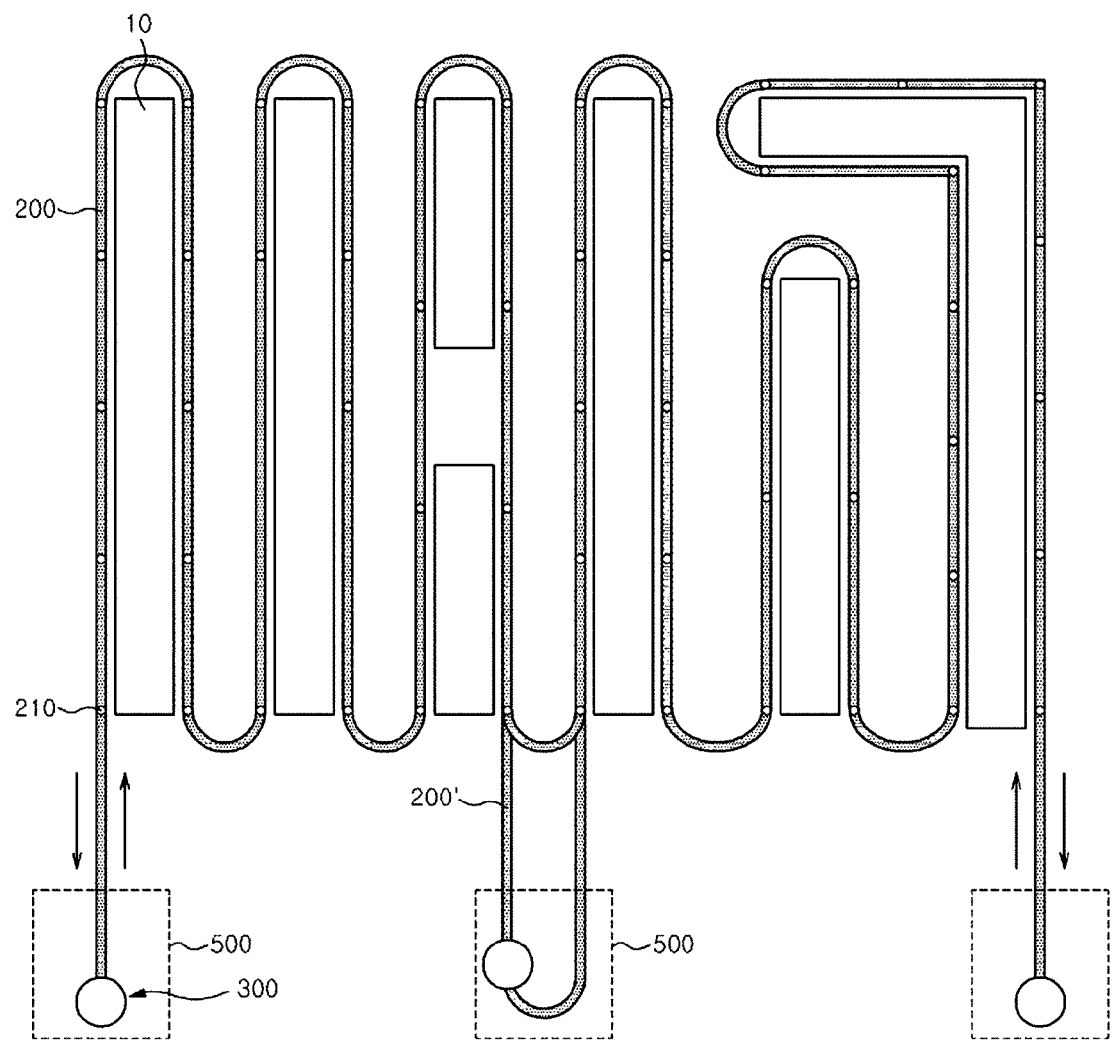
FIG. 7 is a plan view showing an inventory management system using an automated guided vehicle according to a variation of the present invention.

FIG. 5 is a block diagram showing the configuration of an inventory management system using an automated guided vehicle according to an embodiment of the present invention, FIG. 6 is a transverse sectional view taken along line "B-B" of FIG. 2, and FIG. 7 is a plan view showing an inventory management system using an automated guided vehicle according to a variation of the present invention.

As shown in FIGS. 5 and 6, a vehicle 300 may include a body 310, a line recognition unit 320, an obstacle detection unit 330, a drive unit 340, a battery 350, a line recognition unit 320, and a communication module 360.

The body 310 is a housing in which the line recognition units to the communication modules 310 to 360 are mounted. A scanning unit 100 is mounted on the corresponding upper portion of the body 310, the obstacle detection unit 330 is mounted on the corresponding side portion of the body 310, and the line recognition unit 320 and the drive unit 340 may be mounted on the corresponding lower portion of the body 310.

In this case, a guide portion 620 configured in the form of a guide groove may be provided on the side portion of the body 310. When the vehicle 300 moves in parallel with a shelf case, the guide portion 620 is supported by the guidance rail 610 of the shelf case disposed in parallel with the guide lines 200, and thus the vibration of the scanner unit is reduced while the vehicle 300 is moving, thereby achieving the stable scanning of the articles 20.

The line recognition unit 320 includes a magnetic sensor and a guide line identifier reader for reading the guide lines 200, and may recognize various types of information, required for the movement of the vehicle 300, from the identifiers of the guide lines 200. The obstacle detection unit 330 may detect an obstacle located in front of itself, and may apply the information of the detected obstacle to the control unit 400.

The drive unit 340 may include drive motors 342, drive rollers 341, and a support roller 343. For example, the drive unit 340 may include a first drive motor 342$a$ and a second drive motor 342$b$ disposed on both sides of the body 310, a first drive roller 341$a$ and a second drive roller 341$b$ drivably connected to the first drive motor 342$a$ and the second drive motor 342$b$ via drive belts 344, and a support roller 343 disposed in front of the body 310. These first drive motor 342$a$ and second drive motor 342$b$ receive may receive selective drive signals from the control unit 400, and may steer the vehicle 300 in one direction or another direction.

The battery 350 may provide previously charged power to the drive unit 340, and may be charged with power at a charging station 500 if required. The communication module 360 may apply sensing signals, detected by the line recognition unit 320 and the obstacle detection unit 330, to the control unit 400.

Meanwhile, the control unit 400 may move the vehicle 300 along the guide lines 200 by controlling the vehicle 300. For example, the control unit 400 may receive various types of information, required for the movement of the vehicle 300, from the identifiers 210 of the line recognition unit 320, and may apply corresponding drive signals to the drive unit 340 of the vehicle 300. The control unit 400 may receive information about an obstacle from the obstacle detection unit 330, and may control the movement of the vehicle 300, thereby preventing a collision between the obstacle and the vehicle 300.

The control unit 400 may be configured to be included in the vehicle 300, or may be spaced apart from the vehicle 300 and communicatively connected to the vehicle 300 to remotely control the vehicle 300.

The control unit 400 may control a control function regarding the movement of the vehicle 300, and may control the operation of the scanning unit 100. For example, the control unit 400 may receive the location information of the shelf cell 11 from the identifier 210 of the guide line, and may detect whether the vehicle 300 passes through a region where a shelf is located. In this case, while the vehicle 300 is moving along the guide line 200 where a shelf case is not located, the control unit 400 may stop the scanning operation of the scanning unit 100. While the vehicle 300 is moving along the guide line where a shelf is located, the control unit 400 may receive RF signals transferred from the antennas 130 of the scanning unit 100, and may acquire the specific information, such as the individual characteristics, manufacture date, expiration date, etc., of each article 20 placed on the shelf cell 11. Furthermore, when the control unit 400 receives the location information of the shelf cell 11 from an identifier 210 of the guide lines, the control unit 400 may control only the antenna 130, the reader (not shown) and the scanning arm 120 corresponding to the corresponding shelf cell 11, and may selectively turn on and off the internal components of the scanning unit 100 so that the antenna 130, the reader (not shown), and the scanning arm 120 corresponding to another shelf cell 11 are prevented from operating.

Furthermore, the control unit 400 may determine and store the location information of the vehicle 300 via the identifier 210 of the guide lines, and may determine and store the tag information (for example, the type of article, the name of the article, the manufacture date of the article, etc.) of an RF tag, attached to the article 20, via the antenna 130. Accordingly, the control unit 400 stores the location information of the vehicle 300 and the tag information so that they are matched to each other, and may store a location where the article is placed.

The charging station 500 may perform not only the function of a power supply unit for charging the battery 350 of the vehicle 300 but also the function of a depository for temporarily storing the vehicle 300. This charging station 500 may be located at the start point of the guide lines 200 at which the movement of the vehicle 300 starts, or the end point of the guide lines 200 at which the movement of the vehicle 300 terminates.

Furthermore, this charging station 500 may be located at a specific location of the guide lines 200 in order to perform management, such as the charging or emergency repair of the vehicle 300. In this case, the charging station 500 may be located on the guide lines 200, or may be located on a branch line 200' branched off to one side of the guide lines 200, as shown in FIG. 7.

The operation of the present invention configured as described above is described, as follows.

Figure 8:
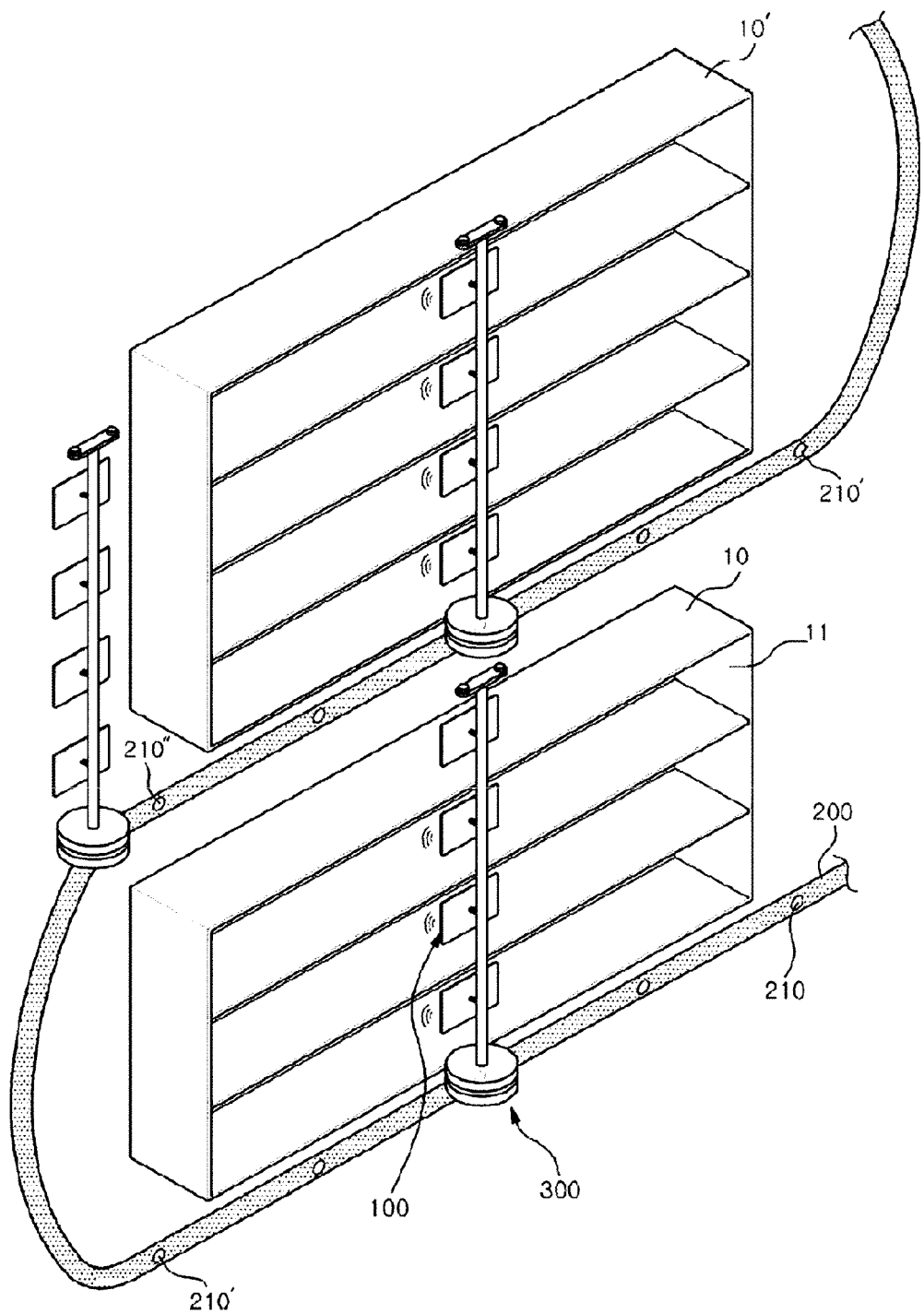
FIG. 8 is a state diagram showing the operating state of an inventory management system using an automated guided vehicle according to an embodiment of the present invention.

FIG. 8 is a state diagram showing the operating state of an inventory management system using an automated guided vehicle according to an embodiment of the present invention.

As shown in FIG. 8, the vehicle 300 located in the charging station 500, i.e., a start point, may receive a drive signal from the control unit 400, and may move rectilinearly along the guide lines 200. In this case, the guide portion 620 of the vehicle 300 may be supported by the guidance rail 610, and thus the vehicle 300 may be stably moved. The scanning unit 100 may be moved along the shelf cases 10 by the vehicle 300, and may scan the articles 20 placed in the shelf cell 11.

In particular, before the vehicle 300 enters the rectilinear guide line 200, the control unit 400 may receive the location information of the shelf cell 11 from the identifier 210 of the guide line 200, and may selectively turn on and off ports using the location information of the shelf cell 11 so that only the antenna 130 corresponding to the corresponding shelf cell 11 can operate. In the present embodiment, the shelf case 10 is configured in three tiers, so that an antenna 130 located to face a fourth tier is turned off and antennas 130 located to face first and third layers are turned on, thereby scanning the articles placed in the shelf cell 11. The vehicle 300 having moved rectilinearly along the guide line 200 may move along the curved guide line 200 in order to move to another shelf 10' at an adjacent location. In this case, the line recognition unit 320 may acquire information about a curved location, from which the curve of the guide line 200 starts, from the first identifier 210' of the guide line 200, and may transfer the information about a curved location to the control unit 400. The control unit 400 may receive location information from the line recognition unit 320, and may stop the scanning operation of the scanning unit 100 while the vehicle 300 is moving in a curved form.

Before the vehicle 300 having moved along the guide line 200 in a curved form enters the rectilinear guide line 200, the control unit 400 may receive the location information of the shelf cell 11 from the second identifier 210" of the guide line 200. The control unit 400 may selectively turn on and off the antennas 130 so that only the antenna 130 corresponding to the corresponding shelf cell 11 is operated and the remaining other antennas 130 are not operated, using the location information of the shelf cell 11. In the present embodiment, the other shelf case 10' is configured in four tiers, and thus all the antennas 130 located to face first to fourth tiers are turned on, thereby scanning the articles placed in the shelf cell 11.

After the vehicle 300 has moved rectilinearly along the guide line 200 located in parallel with the shelf case 10,' the vehicle 300 may receive information about a curved location stored in the first identifier 210' via the control unit 400, and may stop the scanning operation of the scanning unit 100 while moving in a curved form.

The above-described movement of the vehicle 300 and the above-described scanning of the articles 20 via the scanning unit 100 may be successively repeated. During this process, the vehicle 300 may move to the charging station 500 to charge the battery 350 with power, and may be subjected to temporary management at the charging station 500.

The charged vehicle 300 may scan the articles 20 placed in the shelf cell 11 via the scanning unit 100 while moving along the guide lines 200. Furthermore, when the vehicle 300 reaches an end point, the vehicle 300 may be managed and stored at the charging station 500 located at the end point.

The above-described present invention has the superior advantage of improving the rate of reading articles because the scanning unit can efficiently and stably scan the articles placed in the shelf cases while moving the guide lines disposed in parallel with the shelf cases and also because the guide lines that enable the scanning unit to move around the articles placed in the shelf cases within a more proximal distance are provided.

Meanwhile, according to an additional embodiment of the present invention, a scanning unit 100 may selectively include scanning arms 120. For example, antennas 130 may be mounted directly on the support arms 110 of the scanning unit 100. Alternatively, the scanning unit 100 may be composed of a single antenna 130, rather than the pluralities of scanning arms 120 and antennas 130. For example, when a single antenna 130 (or a single scanning arm 120 and a single antenna 130) is installed such that the single antenna 130 is movable along the support arm 110, the single antenna 130 may be configured to scan an upper tier shelf based on the movement of the vehicle 300, and to scan a lower tier shelf based on the movement of the vehicle 300 after the single antenna 130 has moved downward along the support arm 110.

Meanwhile, the control unit 400 may transmit collected tag information to a server (not shown) or a terminal (not shown) at a remote location, thereby transferring the collected tag information to an administrator. In this case, the control unit 400 may transmit collected tag information to an administrator side in real time, or may accumulate collected tag information until the reading of RFID tags are all completed and then transmit the accumulated information to an administrator side.

Furthermore, the control unit 400 may store information about the location of the vehicle 300, when each piece of tag information is collected, along with the tag information, or may transfer information about the location of the vehicle 300, when each piece of tag information is collected, to a remote administrator. In this case, the information about the location of the vehicle 300 may be collected from the identifier 210 included in the guide lines 200. The identifier 210 may include location identification information by which the control unit 400 identifies the location of the vehicle 300. Alternatively, the identifiers 210 may be disposed along a track, formed by the guide lines 200, at regular intervals, and may enable the identification of a location only in such a way that the control unit 400 counts the number of identifiers 210 that are detected while the vehicle 300 is moving along the guide lines 200 from the start point of the track. Accordingly, the control unit 400 may record tag information read at a specific location. Therefore, the approximate location of a shelf case where an article in stock is located may be identified.

Furthermore, when two or more antennas 130 are included in the scanning unit 100, the control unit 400 may record read tag information together with information about an antenna 130 from which the read tag information was read. That is, the read tag information may be recorded separately for each antenna 130. In this case, the individual antennas 130 included in the plurality of antennas 130 may be vertically disposed to correspond to the heights of individual shelf cells included in a shelf case. When pieces of tag information received from the respective antennas 130 are separately recorded, the approximate location or height of an article corresponding to a specific piece of tag information may be estimated.

That is, when estimating the location of an article, corresponding to read specific tag information, on the shelf case, the control unit 400 may determine the lateral location thereof based on the location of the vehicle 300 when the corresponding tag information is received, and may determine the vertical location thereof based on the vertical location of the antenna 130 via which the corresponding tag information is received.

In this case, the tag information of the single RFID tag attached to the single article may be repeatedly read a few times via the antenna 130 before the vehicle 300 becomes sufficiently away from the location of the corresponding article, or may be redundantly read via a plurality of antennas 130 in the proximity of the height of the corresponding article. Accordingly, the control unit 400 may accumulate and store the number of times the same single piece of tag information is read via each antenna 130 at a specific location of the vehicle 300, or may transfer information about the number of times to an administrator side. The control unit 400 or a terminal or a server on the administrator side may determine the location of the article corresponding to the corresponding tag information by specifying the location of the vehicle 300 at which the number of times the corresponding tag information has been read is highest and specifying the antenna 130 at which the number of times the corresponding tag information has been read is highest. For this purpose, the control unit 400 may allow the scanning unit 100 to continue to operate while allowing the vehicle 300 to move in front of a shelf case at a regular speed, or may repeat the operation of stopping the vehicle 300 at predetermined one or more specific locations in front of a shelf case, and driving the scanning unit 100 in the state in which the vehicle 300 is stopped, thereby receiving tag information. That is, the control unit 400 may repeat the operation of reading tag information after stopping the vehicle 300 at a specific location and then driving the scanning unit 100 after moving the vehicle 300 to a subsequent location and stopping it at the subsequent location.

Furthermore, the control unit 400 or the server or terminal at the administrator side may perform various algorithms for identifying a displayed location based on the location of the vehicle 300, when the same single tag information has been repeatedly received, and information about antennas 130, which have received the information, in order to more accurately identify the displayed location of an article. As an example, when a shelf case includes a plurality of shelf cells sectioned in the form of a matrix, the number of times specific tag information corresponding to a specific single article has been received by each antenna 130 may be counted until the vehicle 300 moves from a single vertical section of a shelf cell to a location corresponding to a subsequent vertical section, the process of counting the number of times the same tag information has been received by each antenna 130 may be performed until the vehicle 300 moves from the current vertical section to a location corresponding to a subsequent vertical section, the numbers of times counted by a pair of neighboring antennas 130 in the same interval may be added, and then it may be determined that a corresponding article is present at an approximate location corresponding to a pair of antennas 130 that is present in an interval where the added value is largest. In this embodiment, identifiers 210 that enable locations to be identified may be disposed on the guide lines 200 at locations corresponding to the vertical sections of each shelf case.

In order to allow the method of identifying the displayed location of an article to be more easily understood, a description is given using an example. When a shelf case includes a total of nine shelf cells disposed in three lateral rows and three vertical columns, four antennas disposed at locations corresponding to three lateral intervals (the intervals between vertical sections) and respective vertical sections may be included, and the number of times the same single tag information has been read in each lateral interval by each antenna may be illustrated as an example, as follows:

TABLE 1

|  | First lateral interval | Second lateral interval | Third lateral interval |
|---|---|---|---|
| Number of times first antenna performs reading | 1 | 5 | 15 |
| Number of times second antenna performs reading | 5 | 27 | 42 |
| Number of times third antenna performs reading | 21 | 57 | 103 |
| Number of times fourth antenna performs reading | 18 | 39 | 62 |

The values obtained by adding the numbers of times counted by the neighboring antennas based on the example of Table 1 are described in the following Table 2:

TABLE 2

|  | First lateral interval | Second lateral interval | Third lateral interval |
|---|---|---|---|
| Number of times first and second antennas perform reading | 6 | 32 | 57 |
| Number of times second and third antennas perform reading | 26 | 84 | 145 |
| Number of times third and fourth antennas perform reading | 39 | 96 | 165 |

Based on the description of Table 2, the control unit 400 may determine that an article corresponding to tag information, i.e., a computation target, is located in the right lower one of the total of nine shelf cells, i.e., in a shelf cell having the third lateral interval and the vertical interval between the third and fourth antennas.

It will be apparent that the method of determining the location of an article is merely an example and the control unit 400 or a device on the administrator side which receives read tag information from the control unit 400 may determine the location of an article using various methods.

Although the present invention has been described in detail using preferred embodiments, the scope of the present invention is not limited to the specific embodiments, but should be interpreted based on the attached claims. Furthermore, it should be appreciated that those having ordinary knowledge in the technical field can make many modifications and variations without departing from the range of the present invention.

INDUSTRIAL APPLICABILITY

The embodiments of the present invention have industrial application in the sense of efficiently and stably scanning articles stored on shelf cases while the scanning unit is moving along guide lines disposed in parallel with the shelf cases.

The invention claimed is:

1. An inventory management system using an automated guided vehicle, comprising:
    a scanning unit configured to recognize information about articles placed in a shelf case;
    guide lines deployed along a plurality of shelf cases that are spaced apart from each other;
    a vehicle configured to support the scanning unit, to recognize the guide lines, and to move along the guide lines; and
    a control unit configured to control the vehicle so that the vehicle moves along the guide lines;
    wherein the control unit receives location information of shelf cells of the shelf case and path information of the vehicle that are stored in tags of the guide lines, controls a moving direction of the vehicle, and controls the scanning unit so that only antennas of the scanning unit that are located to face the shelf cells can be operated.

2. The inventory management system of claim 1, further comprising a charging station disposed adjacent to the guide lines, and configured to charge a battery of the vehicle in a state in which the vehicle moves along the guide lines, or moves and stops.

3. The inventory management system of claim 1, further comprising:
    a guidance rail installed on the shelf case in parallel with the guide lines; and
    a guide portion formed on a side portion of the vehicle so that the vehicle can be supported by the guidance rail when the vehicle moves in parallel with the shelf case.

4. The inventory management system of claim 1, wherein the guide lines employ a magnetic guidance method.

5. The inventory management system of claim 1, wherein the vehicle comprises:
    a body configured such that the scanning unit is mounted thereon;
    a line recognition unit configured to recognize the guide lines;
    a drive unit installed on the body, and configured to include drive rollers that move along the guide lines in response to a drive signal from the control unit; and
    a battery configured to provide power to the drive unit.

6. The inventory management system of claim 1, wherein the vehicle further comprises:
    an obstacle detection unit configured to detect an obstacle located in front of itself; and
    a communication module configured to apply sensing signals, detected by the line recognition unit and the obstacle detection unit, to the control unit.

7. The inventory management system of claim 1, wherein the scanning unit comprises:
    a support arm installed on the vehicle;
    scanning arms spaced apart on the support arm in a vertical direction so that the scanning arms face shelf cells of the shelf case; and
    antennas connected to front ends of the scanning arms in order to scan information from articles located in the shelf cells.

8. The inventory management system of claim 7, wherein each of the scanning arms comprises:
- a main scanning arm connected to the support arm; and
- a sub scanning arm connected to an end of the main scanning arm so that the sub scanning arm can be selectively inserted into and retracted from the main scanning arm to adjust a length of the scanning arm.

9. The inventory management system of claim 7, wherein RFID tags are attached to the articles, and the antennas recognize the RFID tags.

10. The inventory management system of claim 7, wherein the antennas are connected to the scanning arms so that the antennas can be tilted.

11. The inventory management system of claim 7, wherein the scanning unit further comprises an image processing unit installed at an upper end of the support arm in order to determine locations of the articles and to capture images of the articles.

* * * * *